(12) United States Patent
Chatterji et al.

(10) Patent No.: US 6,220,354 B1
(45) Date of Patent: Apr. 24, 2001

(54) HIGH STRENGTH FOAMED WELL CEMENT COMPOSITIONS AND METHODS

(75) Inventors: Jiten Chatterji; Bobby J. King; Frank Zamora, all of Duncan; Clyde R. Anderson, Marlow; Billy J. Bennett, Duncan; Roger S. Cromwell, Walters, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/695,578

(22) Filed: Oct. 24, 2000

(51) Int. Cl.$^7$ .......................... E21B 33/13; E21B 33/138
(52) U.S. Cl. .................. 166/293; 106/677; 106/678; 106/711; 106/820; 106/823; 166/309
(58) Field of Search .................................... 166/292, 293, 166/294, 309; 106/672, 677, 678, 711, 802, 808, 809, 820, 823

(56) References Cited

U.S. PATENT DOCUMENTS

| | | |
|---|---|---|
| 3,363,689 | 1/1968 | Smith et al. . |
| 3,661,603 * | 5/1972 | Nicol .................................. 106/672 |
| 3,774,683 | 11/1973 | Smith et al. ........................ 166/293 |
| 4,306,911 | 12/1981 | Gordon et al. . |
| 4,927,462 | 5/1990 | Sugama . |
| 5,133,409 * | 7/1992 | Bour et al. ........................ 166/293 |
| 5,229,019 * | 7/1993 | Forrest ........................... 166/293 X |
| 5,377,760 * | 1/1995 | Merrill ........................... 166/294 X |
| 5,399,195 | 3/1995 | Hansen et al. . |
| 5,421,409 | 6/1995 | Mueller et al. .................... 166/292 |
| 5,643,359 * | 7/1997 | Soroushian et al. ............... 106/805 |
| 5,820,670 | 10/1998 | Chatterji et al. ................. 106/727 |
| 5,900,053 * | 5/1999 | Brothers et al. ............... 166/293 X |
| 6,016,872 | 1/2000 | Davis ................................ 166/312 |
| 6,059,035 | 5/2000 | Chatterji et al. ................. 166/293 |
| 6,059,036 | 5/2000 | Chatterji et al. ................. 166/294 |
| 6,063,738 | 5/2000 | Chatterji et al. ................. 507/269 |
| 6,152,227 * | 11/2000 | Lawson et al. .................... 166/293 |
| 6,173,778 * | 1/2001 | Rae et al. ........................ 166/293 |

FOREIGN PATENT DOCUMENTS 0 867 495 A2   9/1998   (EP) .

OTHER PUBLICATIONS

Brochure entitled FORTA® published by the Forta Corporation of Grove City, Pennsylvania.

Halliburton Energy Services Cementing technical Data Sheet entitled: Tuf Cement Composition.

Smith, Dwight K., *Cementing*, Second Printing, 1990, pp. 34–37.

* cited by examiner

*Primary Examiner*—George Suchfield
(74) *Attorney, Agent, or Firm*—Craig W. Roddy; C. Clark Dougherty, Jr.

(57) ABSTRACT

High strength foamed well cement compositions and methods of cementing subterranean zones penetrated by well bores are provided. The foamed well cement compositions are basically comprised of a hydraulic cement, hydrophilic fibers, water sufficient to form a pumpable slurry, a mixture of foaming and foam stabilizing surfactants and sufficient gas to foam the slurry.

16 Claims, No Drawings

HIGH STRENGTH FOAMED WELL CEMENT COMPOSITIONS AND METHODS

BACKGROUND OF THE INVENTION

1. Field of the Invention

The present invention relates generally to cementing subterranean zones penetrated by well bores, and more particularly, to such methods whereby high strength foamed well cement compositions which are crack and shatter resistant are utilized.

2. Description of the Prior Art

Light weight foamed hydraulic cement compositions are commonly utilized in subterranean well completion and remedial operations. For example, foamed hydraulic cement compositions are used in primary cementing operations whereby pipe strings such as casings and liners are cemented in well bores. In performing primary cementing where light weight cement compositions are required to prevent fracturing of subterranean zones, light weight foamed hydraulic cement compositions are pumped into the annular space between the walls of a well bore penetrating the zones and the exterior surfaces of a pipe string disposed therein. The light weight foamed cement composition is permitted to set in the annular space thereby forming an annular sheath of hard substantially impermeable foamed cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

Multi-lateral wells have recently been developed which include vertical or deviated principal well bores having one or more ancillary laterally extending well bores connected thereto. Drilling and completion equipment is available which allows multiple laterals to be drilled from a principal cased and cemented well bore. Each of the lateral well bores can include a liner cemented therein which is tied into the principal well bore. The lateral well bores can be drilled into predetermined producing formations or zones at any time in the productive life cycle of the well.

In both conventional wells having single well bores and multi-lateral wells having several well bores, the light weight foamed cement compositions utilized for cementing casings or liners in the well bores must have sufficient strength, resiliency, ductility and toughness to resist cracking or shattering as a result of pipe movements, impacts and/or shocks subsequently generated by drilling and other well operations such as perforating. Set foamed cement in wells, and particularly, a set foamed cement sheath in the annulus between a pipe string and the walls of a well bore often fails by cracking or shattering during drilling and/or perforating operations. When the set cement cracks or shatters, rubble is often produced and the seal between the pipe and the walls of the well bore is lost.

Various types of fibers have been utilized in construction cement compositions heretofore. The fibers have been formed of glass, steel, graphite, polyesters, polyamides and polyolefins. Polyolefin fibers have generally been the most preferred in that they are readily available, are low in cost and have high resistance to corrosion and degradation. Fibrillated net-shaped polyolefin fibers have been found to be particularly suitable for use in construction cement compositions because they resist being pulled out of the set cement. The fibers also function to control shrinkage cracking in the early stages of the cement setting process, and after setting, the fibers provide resiliency, ductility and toughness to the cement composition whereby it resists cracking or shattering. When cracking or shattering does occur, the fibers hold the cracked or shattered set cement together and prevent the formation of rubble.

While fibrillated polyolefin net-shaped fibers have been included in well cement compositions heretofore, problems have been encountered because the fibers have been hydrophobic and are difficult to dry blend with cement. Also, the fibers agglomerate in the dry cement when it is conveyed causing plugging to occur, and when the cement and hydrophobic fibers are combined with mixing water, the hydrophobic fibers form mats which prevent their dispersion into and throughout the cement slurry. The lack of dispersion of the fibers in the cement slurry make it difficult to pump and foam.

Thus, there are needs for improved foamed well cement compositions and methods wherein the cement compositions contain fibrillated fibers which can be easily mixed and conveyed with dry cement and subsequently dispersed in the aqueous cement slurry formed prior to pumping and foaming the slurry.

SUMMARY OF THE INVENTION

The present invention provides high strength, resilient, foamed well cement compositions and methods of cementing a subterranean zone using the compositions which meet the needs described above and overcome the deficiencies of the prior art. The compositions of the invention are basically comprised of a hydraulic cement, hydrophilic fibers present in the composition in an amount in the range of from about 0.1% to about 0.25% by weight of the cement in the composition, water present in an amount sufficient to form a pumpable slurry, a mixture of foamed and foam stabilizing surfactants and sufficient gas to foam the slurry.

The improved methods of cementing a subterranean zone penetrated by a well bore of the present invention are basically comprised of the steps of introducing a high strength, resilient, foamed cement composition into the subterranean zone by way of the well bore comprised of a hydraulic cement, hydrophilic fibers, water, a mixture of foaming and foam stabilizing surfactants and a gas. Thereafter, the foamed cement composition is allowed to set in the zone. The compositions and methods of this invention are particularly suitable i-or cementing a pipe string such as casing or a liner in a well bore utilizing a light weight foamed cement composition whereby the set foamed cement can withstand the formation of perforations therein as well as other impacts and shocks subsequently generated by drilling and other well operations without cracking, shattering or forming rubble.

It is, therefore, a general object of the present invention to provide high strength, resilient, foamed well cement compositions and methods of cementing subterranean zones penetrated by well bores using the cement compositions.

Other and further objects, features and advantages of the present invention will be readily apparent to those skilled in the art upon a reading of the description of preferred embodiments which follows.

DESCRIPTION OF PREFERRED EMBODIMENTS

The present invention provides high strength, resilient, foamed well cement compositions and methods of using the compositions for cementing subterranean zones penetrated by well bores. The high strength resilient foamed cement compositions are basically comprised of a hydraulic cement, hydrophilic fibers, water present in an amount sufficient to form a pumpable slurry, a mixture of foaming and foam stabilizing surfactants present in an amount sufficient to form and stabilize the foamed cement composition and sufficient gas to foam the slurry.

Upon setting, a foamed cement composition of this invention has high strength, resiliency, ductility and toughness whereby it resists cracking and/or shattering as a result of impacts or shocks produced in drilling or perforating operations, stresses created by pipe movements and the like. If cracking or shattering does occur, the pieces formed are held together by the hydrophilic fibers in the foamed cement composition.

A variety of hydraulic cements can be utilized in the foamed well cement compositions of this invention including those comprised of calcium, aluminum, silicon, oxygen and/or sulfur which set and harden by reaction with water. Such hydraulic cements include Portland cements, pozzolana cements, gypsum cements, high aluminum content cements, silica cements and high alkalinity cements. Portland cements are generally preferred for use in accordance with the present invention. Portland cements of the types defined and described in the *API Specification For Materials And Testing For Well Cements*, API Specification 10, Fifth Edition, dated Jul. 1, 1990 of the American Petroleum Institute are particularly suitable. Preferred API Portland cements include classes A, B, C, G and H, with API classes G and H being the most preferred.

While fibers formed of various materials can be utilized in accordance with the present invention, the fibers utilized must resist degradation in a hydraulic cement composition. For example, fibers formed of polyesters, polyamides and glass suffer from the disadvantage that they degrade in the presence of hydrated lime. Hydrated lime is released in a cement composition as the cement therein is hydrated. Polyolefin fibers are suitable for use in cement compositions in that polyolefin fibers do not degrade or otherwise lose their strength over time in a set cement composition. However, fibers formed from polyolefins are hydrophobic and as mentioned above, are very difficult to dry blend with hydraulic cements and disperse in water.

In accordance with the present invention, hydrophilic polyolefin fibers are included in the foamed cement compositions of this invention. The hydrophilic polyolefin fibers do not degrade in cement compositions and are readily dry mixed with cement and dispersed in the cement mixing water. Particularly suitable such hydrophilic polyolefin fibers are commercially available from the Forta Corporation of Grove City, Pa.

The preferred polyolefin fibers are polypropylene or polyethylene fibers which are in a fibrillated net configuration which maximizes the long term durability and toughness of a set cement composition including the fibers. The fibrillated net-shaped fibers function exceptionally well in preventing cracking or shattering of set cement compositions containing them, and if cracking or shattering does occur, in holding the cracked or shattered cement together, i.e., the individual pieces produced are held together by the fibers thereby preventing rubble formation.

The normally hydrophobic polyolefin fibers are converted to hydrophilic fibers by treating the hydrophobic fibers with a surface active agent. The most preferred hydrophilic fibers for use in accordance with the present invention are hydrophilic polypropylene fibrillated net-shaped fibers having lengths in the range of from about 0.5 inch to about 1.5 inches.

Generally, the hydrophilic fibers utilized are included in a foamed cement composition of this invention in an amount in the range of from about 0.1% to about 0.25% by weight of hydraulic cement in the composition, more preferably in an amount in the range of from about 0.1% to about 0.125% and most preferably about 0.125%.

The water utilized in the cement compositions of this invention can be fresh water, unsaturated aqueous salt solutions or saturated aqueous salt solutions such as brine or seawater. The water is generally present in the cement compositions in an amount in the range of from about 30% to about 100% by weight of hydraulic cement in the compositions, more preferably in an amount in the range of from about 35% to about 60%.

In order to facilitate the formation and stabilization of a foamed cement composition, at least one foaming and foam stabilizing surfactant is included in the cement compositions. While a variety of foaming and foam stabilizing surfactants can be utilized, a particularly preferred mixture of such surfactants is comprised of an ethoxylated alcohol ether sulfate of the formula $H(CH_2)_a(OC_2H_4)_bOSO_3NH_4^+$ wherein a is an integer in the range of from about 6 to about 10 and b is an integer in the range of from about 3 to about 10, an alkyl or alkene amidopropylbetaine having the formula $R-CONHCH_2CH_2CH_2N^+(CH_3)_2CH_2CO_2^-$ wherein R is a radical selected from the group of decyl, cocoyl, lauryl, cetyl and oleyl and an alkyl or alkene amidopropyldimethylamine oxide having the formula $R-CONHCH_2CH_2CH_2N^+(CH_3)_2O^-$ wherein R is a radical selected from the group of decyl, cocoyl, lauryl, cetyl and oleyl.

The ethoxylated alcohol ether sulfate is generally present in the above described mixture in an amount in the range of from about 60 to about 64 parts by weight. The alkyl or alkene amidopropylbetaine is generally present in the mixture in an amount in the range of from about 30 to about 33 parts by weight and the alkyl or alkene amidopropyldimethylamine oxide is generally present in the additive in an amount in the range of from about 3 to about 10 parts by weight. In order to make the surfactant mixture more easily combinable with the cement slurry, water can be combined with the mixture in an amount sufficient to dissolve the surfactants.

The most preferred foaming and foam stabilizing surfactant mixture of the type described above for use in accordance with this invention is comprised of an ethoxylated alcohol ether sulfate wherein a in the formula set forth above is an integer in the range of from 6 to 10 and the ethoxylated alcohol ether sulfate is present in the surfactant mixture in an amount of about 63.3 parts by weight; the alkyl or alkene amidopropylbetaine is cocoylamidopropylbetaine and is present in the mixture in an amount of about 31.7 parts by weight and the alkyl or alkene amidopropyldimethylamine oxide is cocoylamidopropyldimethylamine oxide and is present in an amount of about 5 parts by weight.

The mixture of foaming and foam stabilizing surfactants is generally included in the foamed cement composition in an amount in the range of from about 1% to about 7.5% by volume of water in the cement composition, preferably in an amount of about 1% to about 5%.

The gas utilized for foaming the cement slurry can be air or nitrogen, with nitrogen being preferred. The gas is present in an amount sufficient to foam the slurry, generally in an amount in the range of from about 20% to about 60% by volume of the slurry.

As will be understood by those skilled in the art, the foamed well cement compositions of this invention can include a variety of conventional additives for improving or changing the properties of the foamed cement compositions. Examples of such additives include, but are not limited to, set retarding agents, fluid loss control agents, dispersing agents, set accelerating agents and formation conditioning agents.

Set retarding agents are included in the foamed cement compositions when it is necessary to extend the time in which the foamed cement compositions can be pumped so that they will not thicken or set prior to being placed at a desired location in a well. Examples of set retarding agents which can be used include, but are not limited to, lignosulfonates such as calcium and sodium lignosulfonate, organic acids such as tartaric acid and gluconic acid, copolymers of acrylic acid, maleic acid and others. The proper amount of set retarding agent required for particular conditions can be determined by conducting a "thickening time test" for the particular retarder and foamed cement composition. Such tests are described in the API Specification 10 mentioned above. A particularly preferred set retarder for use in accordance with the present invention is a copolymer or copolymer salt of 2-acrylamido-2-methylpropane sulfonic acid and acrylic acid. The copolymer comprises from about 60 to about 90 mole percent 2-acrylamido-2-methylpropane sulfonic acid with the balance comprising acrylic acid, and the copolymer or salt thereof preferably has an average molecular weight below about 5,000. When used, a set retarder is included in the foamed cement compositions of this invention in an amount in the range of from about 0.1% to about 2% by weight of hydraulic cement in the compositions.

Examples of fluid loss control agents which can be used include, but are not limited to, cellulose derivatives, modified polysaccharides, polyacrylamides, 2-acrylamido-2-methylpropane sulfonic acid copolymers, polyethyleneimine and the like.

An example of a dispersing agent which can be utilized is comprised of the condensation polymer product of an aliphatic ketone, an aliphatic aldehyde and a compound which introduces acid groups into the polymer, e.g., sodium bisulfite. Such a dispersant is described in U.S. Pat. No. 4,557,763 issued to George et al. on Dec. 10, 1985.

Examples of set accelerating agents which can be utilized include, but are not limited to, calcium chloride, zinc formate and triethanolamine, and examples of formation conditioning agents include, but are not limited to, potassium chloride and sodium chloride.

A particularly preferred foamed cement composition which upon setting has high strength, resiliency, ductility and toughness is comprised of Portland cement, fibrillated polyethylene hydrophilic fibers which are net-shaped present in an amount of about 0.1% to about 0.125% by weight of the cement in the composition, a mixture of foaming and foam stabilizing surfactants comprised of an ethoxylated alcohol ether sulfate present in the mixture in an amount of about 63.3 parts by weight, cocoylamidopropylbetaine present in the mixture in an amount of about 31.7 parts by weight and cocoylamidopropyldimethylamine oxide present in the mixture in an amount of about 5 parts by weight, the mixture being present in the cement composition in an amount in the range of from about 1% to about 5% by volume of the water in the composition, and sufficient gas to foam the slurry.

The improved methods of cementing in a subterranean zone penetrated by a well bore basically comprise the steps of: (a) introducing a foamed cement composition into the subterranean zone by way of the well bore, the foamed cement composition being comprised of a hydraulic cement, hydrophilic fibers, water, a foaming and foam stabilizing surfactant and a gas, and (b) allowing the foamed cement composition to set into a high strength, resilient, ductile and tough foamed cement mass in said zone.

Another improved method of cementing a pipe string in a well bore of the present invention using a light weight foam cement composition comprises the steps of: (a) preparing a foamed cement composition having a density in the range of from about 10 to about 14 pounds per gallon comprising a hydraulic cement, hydrophilic fibers, water, a mixture of foaming and foam stabilizing surfactants and a gas, (b) pumping the foamed cement composition into the annulus between the pipe string and the walls of the well bore; and (c) allowing the cement composition to set into a high strength, resilient, ductile and tough foamed cement mass in said annulus.

In order to further illustrate the methods of the present invention the following examples are given.

EXAMPLE 1

A first foamed cement composition without fibers was prepared by combining Portland Class H cement with fresh water and a mixture of foaming and foam stabilizing surfactants. The density of the resulting slurry was 16.55 pounds per gallon. The slurry was foamed with air to a density of 11.2 pounds per gallon. The slurry was then cured at 140° F. and the compressive and tensile strengths of the set cement were determined.

A second foamed cement composition which included fibers was prepared by mixing the fibers with fresh water followed by combining Portland Class H cement with the water-fiber mixture. A mixture of foaming and foam stabilizing surfactants was added to the resulting slurry which also had a density of 16.55 pounds per gallon. The second cement composition was then foamed with air to a density of 11.2 pounds per gallon, cured at a temperature of 140° F. and the compressive and tensile strengths of the cured cement composition were determined.

The compressive strength tests were determined in accordance with the procedure specified in the above mentioned API Specification 10. The tensile strength tests were performed in accordance with the procedure described in ASTM C307. That is, specimens were prepared in briquette molds having the appearance of dog biscuits with a one square inch cross-sectional area at the middle. Tension was then applied at the enlarged ends of the specimens until the specimens broke at the center area. The tension in pounds per square inch at which the specimen broke is the tensile strength of the material tested.

The quantities of components in the test foamed cement composition and the test results are given in Table I below.

TABLE I

Strength Comparison Of Set Foamed Cement Compositions

| Test Composition No. | Quantity Quantity of Fibers[1], % by wt. of cement | Quantity Quantity of Water[2], % by wt. of cement | Quantity of Foaming and Foam and Foam Stabilizing Surfactants[3], % by volume of water | Foamed Foamed Density, pounds per gallon | Curing Time at 140° C., hrs. | Compressive Strength, psi | Tensile Strength, psi |
|---|---|---|---|---|---|---|---|
| 1 | None | 38 | 1 | 11.2 | 24 | 1015 | 153 |
| 2 | 0.125 | 38 | 1 | 11.2 | 24 | 1527 | 195 |

[1]Hydrophilic polypropylene fibrillated net-shaped fibers
[2]Fresh water
[3]Mixture of ethoxylated alcohol sulfate (63.3 parts wt.) coeoylamidopropylbetaine (31.7 parts wt.) and cocoylamidopropyldimethylamine oxide (5 parts wt.)

From Table I, it can be seen that the foamed cement composition containing fibers had significantly improved compressive and tensile strengths as compared to the foamed cement composition which did not contain fibers. Further, the set specimens of the foamed cement composition containing fibers deformed at the maximum pressure or tension applied to them, but the specimen did not crumble or break as did the specimens without fibers. This indicates that the presence of the fibers in the foamed composition helps prevent rubblizing.

EXAMPLE 2

Test foamed cement compositions with and without fibers were prepared as described in Example 1. Specimens of the cement compositions were cured at 140° F. and the resulting set specimens were subjected to standard mechanical tests and compared. The first standard mechanical test conducted was Young's Modulus of Elasticity (E) which is the relationship of an applied stress to the resultant strain. A highly deformable (plastic) material will exhibit a lower modulus (E) when the confined stress is increased. Thus, Young's modulus is an elastic constant that demonstrates the ability of the tested material to withstand applied loads.

The second standard mechanical test was the determination of Poisson's Ratio ($\mu$) which shows the relationship of axial deformation to lateral deformation. In conducting the test, each specimen was compressed in one direction causing it to shorten in that direction and expand in all perpendicular directions. Poisson's Ratio is an elastic constant measured on the specimen before failure occurs.

The third test conducted on each set foamed cement specimen determined the yield failure of the specimen. The yield failure is the point at which an applied load has exceeded the elastic limits of the specimen whereby some permanent deformation has resulted such as a stress fracture or the like.

The standard mechanical tests were conducted on the foamed cement specimens to determine Young's Modulus of Elasticity, Poisson's Ratio and yield failure. Specimen characterization and visual appraisal was used as the main criterion for distinction between the two foamed cement compositions. The tests were made using confining stresses of 0, 500, 1000 1500 psi. The results of the tests are given in Table II below.

TABLE II

Mechanical Behavior Comparison Of Set Foamed Cement Compositions

| Test Composition No. | Quantity of Fibers[1], % by wt. of cement | Quantity of Water[2], % by wt. of cement | Quantity of Foaming and Foam Stabilizing Surfactants[3], % by vol. of water | Foamed Density, pounds per gallon | Confinement Pressure, psi | Young's Modulus, million psi | Poisson's Ratio | Yield Failure, psi |
|---|---|---|---|---|---|---|---|---|
| 1 | None | 38 | 1 | 11.2 | 0 | 0.802 | 0.138 | 1200 |
| 1 | None | 38 | 1 | 11.2 | 500 | 0.531 | 0.180 | 2300 |
| 1 | None | 38 | 1 | 11.2 | 1000 | 0.526 | 0.189 | 2400 |
| 1 | None | 38 | 1 | 11.2 | 1500 | 0.508 | 0.167 | 2600 |
| 2 | 0.125 | 38 | 1 | 11.2 | 0 | 0.650 | 0.167 | 1200 |
| 2 | 0.125 | 38 | 1 | 11.2 | 500 | 0.549 | 0.132 | 1950 |
| 2 | 0.125 | 38 | 1 | 11.2 | 1000 | 0.438 | 0.132 | 1650 |
| 2 | 0.125 | 38 | 1 | 11.2 | 1500 | 0.462 | 0.170 | 2200 |

[1]Hydrophilic polypropylene fibrillated net-shaped fibers
[2]Fresh water
[3]Mixture of ethoxylated alcohol sulfate (63.3 parts wt.) cocoylamidopropylbetaine (31.7 parts wt.) and cocoylamidopropyldimethylamine oxide (5 parts wt.)

Reduced grain size, when compared to porosity or increased bonding (from the fibers) generally decreases the apparent Young's Modulus as increasing confining loads are applied. At the same time, in deformable materials there is a trend of slight increase in Poisson's Ratio with each increase in confining pressure indicating a more moldable plastic material. These trends are seen in Table II above and they are more evident in the specimens containing fibers than in the specimens which do not contain fibers.

The purpose of cementing a pipe string in a well bore is to provide a cement sheath in the annulus between the pipe string and the well bore which is bonded therein and prevents fluid migration through the annulus, to maintain the pipe string in the well bore and to protect the pipe string from formation movement. The presence of the fibers in a foamed cement composition increases the foamed cement composition's ability to carry out its purpose as clearly shown by the test results given in Tables I and II above.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved method of cementing in a subterranean zone penetrated by a well bore comprising the steps of:
   (a) introducing a foamed cement composition into said subterranean zone by way of said well bore, said foamed cement composition being comprised of a hydraulic cement, hydrophilic fibers, water, at least one foaming and foam stabilizing surfactant and a gas; and
   (b) allowing said foamed cement composition to set into a high strength, resilient, ductile and tough foamed cement mass in said zone.

2. The method of claim 1 wherein said hydraulic cement is selected from the group consisting of Portland cements, pozzolana cements, gypsum cements, slag cements, silica cements and high aluminum content cements.

3. The method of claim 1 wherein said cement is Portland cement.

4. The method of claim 1 wherein said hydrophilic fibers are polyolefin fibers coated with a hydrophilic surface active agent present in an amount in the range of from about 0.1% to about 0.25% by weight of the cement in said composition.

5. The method of claim 1 wherein said hydrophilic fibers are hydrophilic fibrillated polyethylene net-shaped fibers.

6. The method of claim 1 wherein said water is selected from the group consisting of fresh water, unsaturated salt solutions and saturated salt solutions and is present in an amount in the range of from about 30% to about 100% by weight of the cement in said composition.

7. The method of claim 1 wherein said foaming and foam stabilizing surfactant is comprised of a mixture of an ethoxylated alcohol ether sulfate present in said mixture in an amount of about 63.3 parts by weight, cocoylamidopropylbetaine present in said mixture in an amount of about 31.7 parts by weight and cocoylamidopropyldimethylamine oxide present in said mixture in an amount of about 5 parts by weight, said mixture being present in an amount in the range of from about 1% to about 7.5% by weight of water in said composition.

8. The method of claim 1 wherein said gas is selected from the group consisting of air and nitrogen and is present in an amount in the range of from about 20% to about 60% by volume of said slurry.

9. An improved method of cementing a pipe string in a well bore using a light weight foamed cement composition comprising the steps of:
   (a) preparing a foamed cement composition having a density in the range of from about 10 to about 14 pounds per gallon comprising a hydraulic cement, hydrophilic fibers, water, a mixture of foaming and foam stabilizing surfactants and a gas;
   (b) pumping said foamed cement composition into the annulus between said pipe string and the walls of said well bore; and
   (c) allowing said cement composition to set into a high strength, resilient, ductile and tough foamed cement mass in said annulus.

10. The method of claim 9 wherein said hydraulic cement is selected from the group consisting of Portland cements, pozzolana cements, gypsum cements, slag cements, silica cements and high aluminum content cements.

11. The method of claim 9 wherein said cement is Portland cement.

12. The method of claim 9 wherein said hydrophilic fibers are polyolefin fibers coated with a hydrophilic surface active agent present in an amount in the range of from about 0.1% to about 0.25% by weight of the cement in said composition.

13. The method of claim 9 wherein said hydrophilic fibers are hydrophilic fibrillated polyethylene net-shaped fibers.

14. The method of claim 9 wherein said water is selected from the group consisting of fresh water, unsaturated salt solutions and saturated salt solutions and is present in an amount in the range of from about 30% to about 100% by weight of the cement in said composition.

15. The method of claim 9 wherein said mixture of foaming and foam stabilizing surfactants is comprised of an ethoxylated alcohol ether sulfate present in said mixture in an amount of about 63.3 parts by weight, cocoylamidopropylbetaine present in said mixture in an amount of about 31.7 parts by weight and cocoylamidopropyldimethylamine oxide present in said mixture in an amount of about 5 parts by weight, said mixture being present in an amount in the range of from about 1% to about 7.5% by weight of water in said composition.

16. The method of claim 9 wherein said gas is selected from the group consisting of air and nitrogen and is present in an amount in the range of from about 20% to about 60% by volume of said slurry.

* * * * *